(12) United States Patent
Sjöland et al.

(10) Patent No.: US 11,177,564 B2
(45) Date of Patent: Nov. 16, 2021

(54) ANTENNA CONNECTION CIRCUITS

(71) Applicant: Telefonaktiebolaget LM Ericsson (publ), Stockholm (SE)

(72) Inventors: Henrik Sjöland, Lund (SE); Stefan Andersson, Flyinge (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 99 days.

(21) Appl. No.: 16/639,147

(22) PCT Filed: Sep. 22, 2017

(86) PCT No.: PCT/EP2017/074122
§ 371 (c)(1),
(2) Date: Feb. 14, 2020

(87) PCT Pub. No.: WO2019/057299
PCT Pub. Date: Mar. 28, 2019

(65) Prior Publication Data
US 2020/0235467 A1 Jul. 23, 2020

(51) Int. Cl.
*H01P 5/16* (2006.01)
*H01Q 1/50* (2006.01)
*H04B 1/40* (2015.01)

(52) U.S. Cl.
CPC ............. *H01Q 1/50* (2013.01); *H04B 1/40* (2013.01)

(58) Field of Classification Search
CPC .. H01Q 1/50; H01Q 1/48; H01Q 3/34; H01Q 21/065; H01Q 21/0075; H01Q 3/40;
(Continued)

(56) References Cited

U.S. PATENT DOCUMENTS

| | | | | |
|---|---|---|---|---|
| 5,969,561 A | * | 10/1999 | McGillan | H03H 11/24 327/308 |
| 6,009,314 A | * | 12/1999 | Bjork | H01P 1/15 455/83 |

(Continued)

FOREIGN PATENT DOCUMENTS

WO  2015077876 A1   6/2015

OTHER PUBLICATIONS

Li, C. et al., "A High Frequency Tunable Differential Active Inductor and Its Application to Power Dividers", 2008 51st Midwest Symposium on Circuits and Systems, Aug. 10, 2008, pp. 285-288, IEEE.

*Primary Examiner* — Dimary S Lopez Cruz
*Assistant Examiner* — Bamidele A Jegede
(74) *Attorney, Agent, or Firm* — Coats & Bennett, PLLC (57) ABSTRACT

The disclosure relates to arrangements for antenna interfaces configurable to efficiently support different communication modes. This is achieved by an antenna connection circuit 10 for a communication device 1 wherein the antenna connection circuit 10 is configurable for communication modes. The antenna connection circuit comprises a first quarter-wave transformer qw1 coupled between an antenna port A and an transmitter port Tx, and a second quarter-wave transformer qw2 coupled between the antenna port A and a receiver port Rx. The antenna connection circuit further comprises a first ground switch s1 coupled between the receiver port Rx and a first ground connection g1, and a second ground switch s2 is coupled between the transmitter port Tx and a second ground connection g2. The antenna connection circuit further comprises a resistor R and a resistor switch s3 coupled in series between the receiver port Rx and the transmitter port Tx, and an inverting amplifier switch s4 coupled between the receiver port Rx and an input
(Continued)

port I1 of an inverting amplifier Amp1, and an output port O1 of the inverting amplifier Amp1 is coupled to the transmitter port Tx.

20 Claims, 6 Drawing Sheets (58) Field of Classification Search
CPC ........ H01Q 1/38; H01Q 21/0006; H01Q 3/30; H01Q 21/061; H01P 3/081; H04B 1/48; H04B 1/52; H04B 2001/485; H04B 15/04; H04B 1/0458; H04B 1/58; H04L 5/1461; H03H 7/463
See application file for complete search history.

(56) References Cited

U.S. PATENT DOCUMENTS

| | | | |
|---|---|---|---|
| 6,108,313 A * | 8/2000 | Lee | H04B 1/005 370/294 |
| 8,536,636 B2 * | 9/2013 | Englekirk | H03K 17/161 257/303 |
| 8,874,050 B1 * | 10/2014 | Hietala | H01P 5/184 455/127.1 |
| 9,337,991 B2 | 5/2016 | Ali-Ahmad | |
| 2004/0116076 A1 * | 6/2004 | Kuramochi | H04B 1/48 455/73 |
| 2004/0214530 A1 * | 10/2004 | Brandt | H04B 1/48 455/90.1 |
| 2004/0259505 A1 * | 12/2004 | Vasanth | H04B 1/48 455/78 |
| 2009/0285135 A1 | 11/2009 | Rousu et al. | |
| 2013/0127564 A1 | 5/2013 | Ding et al. | |
| 2013/0258911 A1 * | 10/2013 | Choksi | H03H 7/463 370/277 |
| 2014/0313947 A1 * | 10/2014 | Ali-Ahmad | H04B 1/525 370/278 |
| 2015/0303981 A1 * | 10/2015 | Sjoland | H04B 1/525 370/278 |
| 2016/0190994 A1 * | 6/2016 | Shi | H03F 3/195 330/290 |
| 2016/0218767 A1 * | 7/2016 | Li | H04B 1/401 |
| 2016/0241204 A1 * | 8/2016 | Nguyen | H04B 1/0458 |
| 2016/0242113 A1 * | 8/2016 | McIntyre | H04W 52/0209 |
| 2016/0352386 A1 * | 12/2016 | Mirzaei | H04B 1/525 |
| 2017/0019141 A1 * | 1/2017 | Campbell | H04B 1/48 |
| 2017/0207902 A1 * | 7/2017 | Lakhani | H04B 7/2628 |
| 2018/0010943 A1 * | 1/2018 | Xu | G01N 29/032 |
| 2019/0158031 A1 * | 5/2019 | Klaren | H03F 1/56 |

* cited by examiner

ANTENNA CONNECTION CIRCUITS

TECHNICAL FIELD

The disclosure relates to arrangements for antenna interfaces. More specifically, the proposed technique relates to antenna connection circuits configurable for efficiently supporting different reception and transmission modes, e.g. Full Duplex reception/transmission, Frequency Domain Duplex, FDD, reception/transmission and Time Domain Duplex, TDD, reception/transmission.

BACKGROUND

In typical cellular equipment the antenna elements are shared between receiver and transmitter. This situation is illustratively shown in FIG. 1 where a communication device 1, e.g. an UE or a base station, comprises antenna circuitry 3 with an antenna port A, receiving circuitry 4 with a receiver port Rx, and transmission circuitry 5 with a transmitter port Tx. The ports Rx, Tx, A are connected to an antenna connection circuit 10. One or several transmission and/or reception modes are supported depending on the circuitry of the antenna connection circuit 10.

Figure 1:
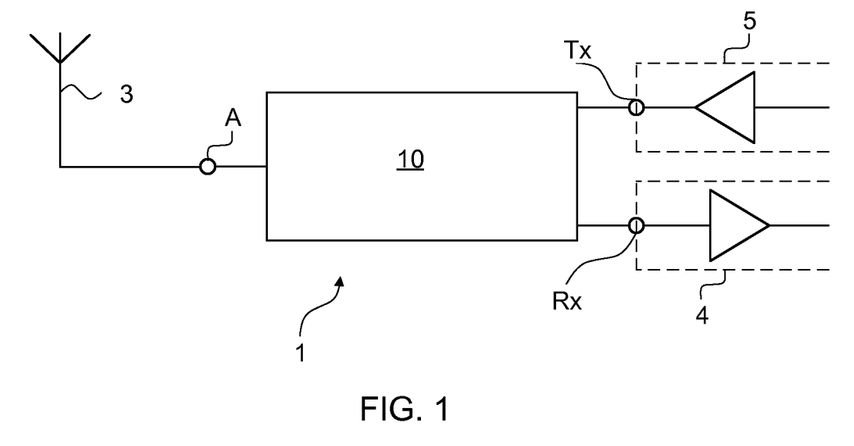
FIG. 1 illustrates an exemplary communication device according to some embodiments of the present disclosure.

For example, in a Frequency Division Duplex, FDD, system, reception and transmission are accomplished by an antenna connection circuit 10 with a duplex filter, which has ports for the receiver, transmitter and antenna. The receiver and transmitter then operate at different frequencies, allowing the duplex filter to separate their signals.

In a Time Division Duplex, TDD, system, the antenna connection circuit 10 may comprise a switch. Hence, compared to the FDD system the antenna is connected to receiver and transmitter through an antenna switch. The receiver and transmitter are then not active simultaneously, and the switch connects the part that is active to the antenna.

Another alternative is a full duplex system where both receiver and transmitter are active simultaneously at the same frequency. This can for example be realized by network employing electrical balance to share the antenna between receiver and transmitter. Such networks, however, have higher signal losses compared to duplexers and antenna switches.

Current antenna interface solutions are rather inflexible since different solutions are required for different communication modes. That is, they are not able to efficiently support different use cases. For instance in FDD systems a large number of duplex filters are used to cover the different frequency bands, selected by switches. To be able to support TDD or full duplex in the same bands would add significant complexity, which make the antenna interface expensive, bulky and lossy. Adding to the complexity, such solutions have further requirements for the different use cases (communication modes), for example different requirements of antenna to transmitter isolation.

Hence, there is a need for an antenna connection circuit which efficiently supports different communication modes.

SUMMARY

It is an object of some embodiments to solve or mitigate, alleviate, or eliminate at least some of the above or other disadvantages.

According to a first aspect, this object is achieved by an antenna connection circuit for a communication device. The antenna connection circuit is configurable for communication modes comprising at least a first communication mode and a second communication mode. The antenna connection circuit comprises an antenna port, a transmitter port, a receiver port, a first quarter-wave transformer, a second quarter-wave transformer, a first ground switch, a second ground switch, a resistor switch, an inverting amplifier switch, a resistor, an inverting amplifier comprising an input port, an output port, a first ground connection, and a second ground connection. Moreover, the first quarter-wave transformer is coupled between the antenna port and the transmitter port. The second quarter-wave transformer is coupled between the antenna port and the receiver port. The first ground switch is coupled between the receiver port and the first ground connection. The second ground switch is coupled between the transmitter port and the second ground connection. The resistor and the resistor switch are coupled in series between the receiver port and the transmitter port.

The inverting amplifier switch is coupled between the receiver port and the input port of the inverting amplifier, and the output port of the inverting amplifier is coupled to the transmitter port.

One advantage is that the antenna connection circuit is small compared to previous solutions. Further, the circuit is a low cost solution since it can be produced with easy available cheap components. The solution is flexible since the circuitry efficiently supports several communication modes. Moreover, a low loss is provided in the different communications mode.

According to some embodiments the first ground switch is open, the second ground switch is closed, the resistor switch is open, and the inverting amplifier switch is open in the first communication mode.

Such combination of switch statuses provides an antenna connection circuit at least for efficient Time Domain Duplex, TDD, reception.

According to some embodiments the first ground switch is closed, the second ground switch is open, the resistor switch is open, and the inverting amplifier switch is open in the second communication mode.

According to some embodiments the first ground switch is open, the second ground switch is open, the resistor switch is closed, and the inverting amplifier switch is closed in the second communication mode.

According to some embodiments the antenna connection circuit further comprises an open receiver port switch coupled in series to the receiver port.

Such combination of switch statuses provides an antenna connection circuit at least for efficient Time Domain Duplex, TDD, transmission.

According to a second aspect, an antenna connection circuit for a communication device is provided. The antenna connection circuit is configurable for communication modes, comprising at least a first, a second, a third and a fourth communication mode. The antenna connection circuit comprises an antenna port, a transmitter port, a receiver port, a first quarter-wave transformer, a second quarter-wave transformer, a first ground switch, a second ground switch, an inverting amplifier switch, a non-inverting amplifier switch, an inverting amplifier comprising an input port, an output port, a non-inverting amplifier comprising an input port, an output port, a first ground connection, and a second ground connection. Further, the first quarter-wave transformer is coupled between the antenna port and the transmitter port. The second quarter-wave transformer is coupled between the antenna port and the receiver port. The first ground switch is coupled between the receiver port and the first ground connection. The second ground switch is coupled between the transmitter port and the second ground connection. The inverting amplifier switch is coupled between the receiver port and the input port of the inverting amplifier and the output port of the inverting amplifier is coupled to the transmitter port. The non-inverting amplifier switch is coupled between the transmitter port and the input port of the non-inverting amplifier and the output port of the non-inverting amplifier is coupled to the receiver port.

One advantage is that the antenna connection circuit is small compared to previous solutions. Further, the circuit is a low cost solution since it can be produced with easy available cheap components. The solution is flexible since the circuitry efficiently supports several communication modes. Moreover, a low loss is provided in the different communications mode.

According to some embodiments the first ground switch is open, the second ground switch is open, the inverting amplifier switch is closed, and the non-inverting amplifier switch is closed in the third communication mode or the fourth communication mode.

Such combination of switch statuses provides an antenna connection circuit at least for efficient Frequency Domain Duplex, FDD, reception and/or Frequency Domain Duplex, FDD, transmission and/or Full Duplex reception and/or Full Duplex transmission.

According to some embodiments the first ground switch is open, the second ground switch is closed, the inverting amplifier switch is open, and the non-inverting amplifier switch is open in the first communication mode.

Such combination of switch statuses provides an antenna connection circuit at least for efficient Time Domain Duplex, TDD, reception.

According to some embodiments the first ground switch is closed, the second ground switch is open, the inverting amplifier switch is open, and the non-inverting amplifier switch is open in the second communication mode.

Such combination of switch statuses provides an antenna connection circuit at least for efficient Time Domain Duplex, TDD, transmission.

According to some embodiments the antenna connection circuit further comprises a resistor and a resistor switch, wherein the resistor and the resistor switch are coupled in series between the receiver port and the transmitter port.

According to some embodiments the resistor switch is open.

Such combination of switch statuses provides an antenna connection circuit at least for efficient Time Domain Duplex, TDD, reception and/or transmission.

According to some embodiments the first ground switch is open, the second ground switch is open, the resistor switch is closed, the inverting amplifier switch is closed, and the non-inverting amplifier switch is open in the second communication mode.

According to some embodiments the antenna connection circuit further comprises an open receiver port switch coupled in series to the receiver port.

Such combination of switch statuses provides an antenna connection circuit with at least an efficient Time Domain Duplex, TDD, transmit isolation mode.

According to some embodiments, an impedance of the antenna port is essentially equal to a system impedance. Further, an impedance of the transmitter port, an impedance of the receiver port, an impedance of the resistor, an impedance of the first quarter-wave transformer, and an impedance of the second quarter-wave transformer are proportional to the system impedance. Moreover, a transconductance of the inverting amplifier and a transconductance of the non-inverting amplifier are proportional to the inverse of the system impedance.

One advantage is that, ideally, there is no insertion loss from the transmit circuitry to the antenna or from the antenna to the receiver circuitry. Additionally, there is reverse isolation between antenna and transmitter/receiver.

According to a third aspect of the proposed solutions, a communication device, comprising an antenna connection circuit according to any of the first and second aspects, is provided.

According to some embodiments the communication device further comprises transmission circuitry coupled to the transmitter port and receiving circuitry coupled to the receiver port.

According to some embodiments the communication device further comprises antenna circuitry coupled to the antenna port.

Thus, there is provided herein arrangements which efficiently support different communication modes.

In some embodiments, any of the above aspects may additionally have features and/or advantages identical with or corresponding to any of the various features and/or advantages as explained above for any of the other aspects.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

Aspects of the present disclosure will be described more fully hereinafter with reference to the accompanying drawings. The apparatus and method disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the disclosure. As used herein, the singular forms "a", "an" and "the" are intended to include the plural forms as well, unless the context clearly indicates otherwise.

As previously mentioned, in many communication devices the antenna elements are shared between receiver and transmitter. To facilitate such solution different antenna connection circuits are utilized. Present solutions are rather inflexible and commonly only support one or a few communication modes. A non-exhaustive list of exemplary communication modes are Time Division Duplex, TDD, reception/transmission, Frequency Division Duplex, FDD, reception/transmission, and Full Duplex reception/transmission. These communication modes will serve as examples in the described embodiments; however, the claimed subject matter is not limited to these.

Time-division duplexing, TDD, mode is the application of time-division multiplexing to separate outward and return signals utilizing the same carrier frequency. Frequency-division duplexing, FDD, mode means that the transmitter and the receiver operate at different carrier frequencies but transmit and receive simultaneously. Full duplex mode means that both the receiver and the transmitter are active simultaneously at the same frequency. Hence, this is a special case of TDD or FDD where the duplex distance is zero.

In upcoming 5G systems it is foreseen that millimeter waves will be used. To improve the range of these systems, a large number of antenna elements will be used in phase steered arrays. There is then a need to obtain reverse isolation between antenna and transmitter to avoid effects related to coupling between antennas.

Hence, there are many requirements on radio interfaces, which vary depending on use case of the system, but currently common radio interface circuits support only a limited amount of reconfigurability. For example, In WO2015077876A1 a Wilkinson combiner is utilized in order to obtain Frequency Domain Duplex, FDD, and Full Duplex communication.

The herein described embodiments of antenna connection circuits effectively support different communication modes by connecting cheap and/or small electrical components in a clever way. Different communications modes are then supported by opening and closing switches.

Figure 2:
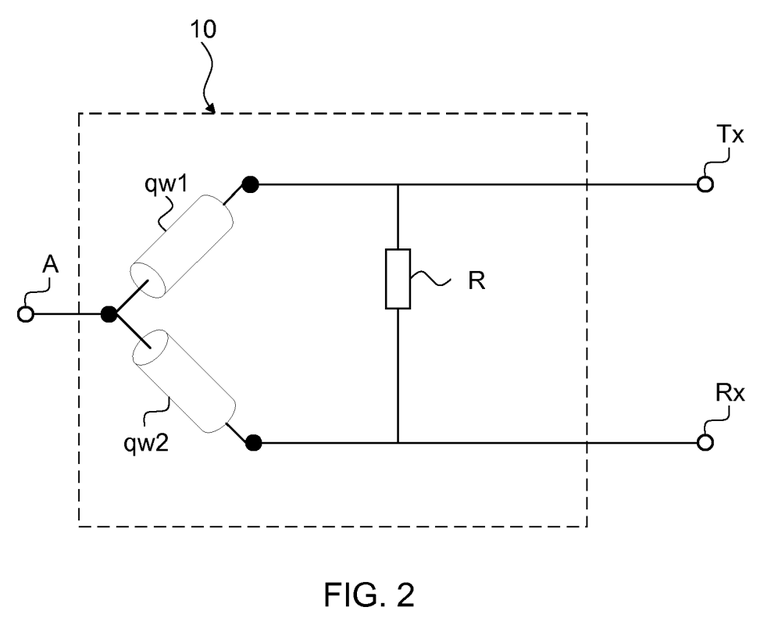
FIGS. 2-11 illustrate examples of antenna connection circuits according some embodiments of the present disclosure.

The circuitry of some of the proposed circuits comprises a Wilkinson power combiner. To facilitate the understanding of the proposed technique the Wilkinson power combiner is described. FIG. 2 shows a Wilkinson combiner utilized as an antenna connection device 10. It contains two quarter-wave transmission lines qw1, qw2 and one resistor R. A quarter-wave transmission line introduces a phase shift of 90 degrees. In its basic configuration it can be used to support full duplex communication, or frequency duplex with small duplex distances. It causes 3 dB insertion loss between antenna and transmitter, and between antenna and receiver. The losses of the transmission lines will be added to the 3 dB insertion losses However, such solution is slightly better than the electrical balance isolator based on transformers. Further, the receiver and transmitter are isolated For example, in FDD transmission mode, no signal from the transmitter reaches the receiver. This is explained by looking at a node between the second quarter-wave transmission line qw2 and the resistor R. In this node one signal arrives which has passed through the resistor (no phase shift). This signal is cancelled by the transmitting signal which has passed through the two quarter-wave transmission lines qw1, qw2 and thereby has a 180 degrees phase shift.

In one example, the characteristic impedances of the antenna port A, the transmitter port Tx and the receiver port Rx are 50 Ohm, the characteristic impedances of the quarter-wave transmission lines are 50 Ohm*sqrt(2) and the resistor R has the resistance 2*50 Ohm. Such configuration support at least full duplex communication.

When "*" is used herein it is to be understood as "multiplied by".

Some embodiments disclosed herein utilize that a Wilkinson power combiner can be modified to perform the functions of an adaptive antenna interface. It can operate in full duplex, FDD, TDD, and TDD with transmitter isolation mode. This provides a large flexibility in the operation of a transceiver. The circuitry uses quarter-wave transmission lines, switches, resistors, and an auxiliary amplifier(s) for the isolation mode. In one case, the auxiliary amplifier is isolated from the transmission signal and hence only needs to process the signal from the antenna. Isolation of transmitter from the antenna is normally associated with circulators, which are bulky and expensive components. With the proposed circuit including a gyrator isolation can be achieved. The proposed solutions have potential to be more flexible, smaller, and can be produced at lower cost.

Figure 3:
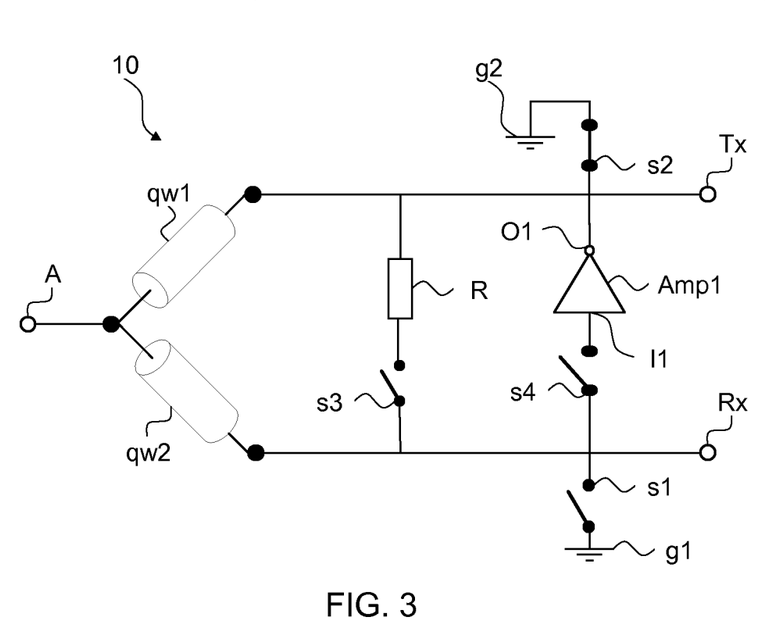

FIG. 3 illustrates an antenna connection circuit 10 for a communication device 1 according to some aspects of the disclosed subject matter. An antenna connection circuit is an interface between the antenna circuitry, receiving circuitry and/or transmission circuitry. It is designed to support one or several different communication modes. In other words, it is a reconfigurable antenna interface.

The antenna connection circuit 10 is configurable for communication modes, comprising at least a first communication mode and a second communication mode.

According to some aspects, the first communication mode is Time Domain Duplex, TDD, reception. According to further aspects, the second communication mode is Time Domain Duplex, TDD, transmission.

The antenna connection circuit 10 comprises an antenna port A, a transmitter port Tx, and a receiver port Rx. An antenna port is a port of antenna circuitry comprising or connectable to an antenna. The antenna circuitry is configurable for wirelessly receiving and/or transmitting signals. A transmitter port Tx is a port of transmission circuitry configurable of transmitting signals. Moreover, an Rx port is port of a receiving circuitry configurable of receiving signals.

According to aspects, the receiving circuitry comprises a Low-Noise Amplifier, LNA. According to aspects, the transmission circuitry comprises a Power Amplifier, PA.

The antenna connection circuit 10 comprises a first quarter-wave transformer qw1 and a second quarter-wave transformer qw2. It further comprises a first ground switch s1, a second ground switch s2, a resistor switch s3, and an inverting amplifier switch s4. The switches act as disconnections when open.

The antenna connection circuit further comprises a resistor R, an inverting amplifier Amp1 comprising an input port I1 and an output port O1. The inverting amplifier introduces a phase shift of 180 degrees. According to aspects, the inverting amplifier is an inverting transconductance amplifier.

The antenna connection circuit further comprises a first ground connection g1, and a second ground connection g2. According to aspects the first ground connection g1 and the second ground connection g2 may be the same ground connection. A ground connection may be electrical grounding, earthing or a connection to a reference potential.

As shown in FIG. 3, the first quarter-wave transformer qw1 is coupled between the antenna port A and the transmitter port Tx. The second quarter-wave transformer qw2 is coupled between the antenna port A and the receiver port Rx. Moreover, the first ground switch s1 is coupled between the receiver port Rx and the first ground connection g1. Furthermore, the second ground switch s2 is coupled between the transmitter port Tx and the second ground connection g2. The resistor R and the resistor switch s3 are coupled in series between the receiver port Rx and the transmitter port Tx. According to aspects, the resistor R is coupled in series between the receiver port Rx and the resistor switch s3. According to alternative aspects, the resistor switch s3 is coupled in series between the receiver port Rx and the resistor R.

Furthermore, the inverting amplifier switch s4 is coupled between the receiver port Rx and the input port I1 of the inverting amplifier Amp1, and the output port O1 of the inverting amplifier Amp1 is coupled to the transmitter port Tx. In other words, the serial connection of the resistor R and the resistor switch s3 and a serial connection of the inverting amplifier switch s4 and the inverting amplifier Amp1 are in parallel.

According to aspects, the receiver port Rx is coupled to the input port I1 of the inverting amplifier Amp1 and the inverting amplifier switch s4 is coupled between output port O1 of the inverting amplifier Amp1 and the transmitter port Tx.

According to aspects, the inverting amplifier switch s4 is integrated in the inverting amplifier Amp1.

When the term coupled is used herein it is understood that the components are operably connected. That is, the components do not need to be directly coupled. According to aspects, additional components may be connected in between.

By using this solution the antenna interface can be reconfigured for different modes of operation. It can handle full duplex, frequency duplex, FDD, time division duplex, TDD, as well as transmission with isolation. All this can be achieved with simple circuitry featuring transmission lines, a resistor, an amplifier, and switches for reconfiguration.

TDD Mode

Figure 4:
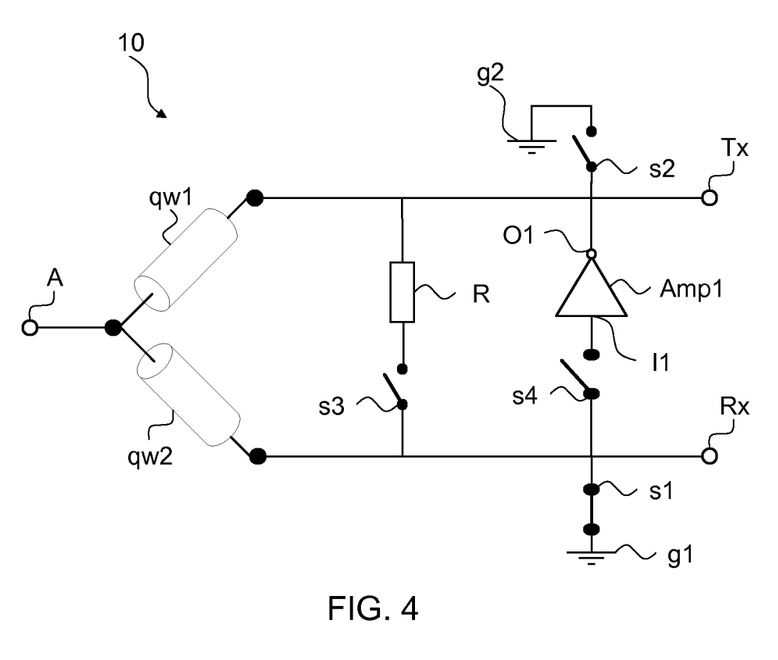

Aspects of antenna connection circuits reconfigurable for TDD mode are now described in relation to FIGS. 3-4.

According to aspects, the first ground switch s1 is open, the second ground switch s2 is closed, the resistor switch s3 is open, and the inverting amplifier switch s4 is open in the first communication mode, as shown in FIG. 3.

The circuit is configured for TDD reception operation. The resistor is switched out of the circuit and switches are used to shunt the unused port, i.e. the transmitter port, to signal ground, which eliminates the 3 dB insertion loss. This is due to the fact that the first quarter-wave transmission line qw1 is grounded and according to transmission line theory it acts as an open circuit.

According to further aspects, as shown in FIG. 4, the first ground switch s1 is closed, the second ground switch s2 is open, the resistor switch s3 is open, and the inverting amplifier switch s4 is open in the second communication mode.

The circuit is configured for TDD transmit operation. The resistor is switched out of the circuit and switches are used to shunt the unused port, i.e. the receiver port, to signal ground, which eliminates the 3 dB insertion loss. This is due to the fact that the second quarter-wave transmission line qw1 is grounded, i.e., it acts as an open circuit.

When the antenna connection circuit 10 operates in TDD mode (FIGS. 3-4), the circuit has a very low loss, only being due to switches and transmission lines.

In comparison with the antenna connection circuit that only comprises the Wilkinson power combiner (FIG. 2), the transmitter and receiver may also be configured to work in an environment with twice the impedance as described and exemplified in connection to FIG. 2. The remaining losses will be very low.

A further advantage is that series switches can be avoided at the transmitter output. The problem of a series switch at the transmitter output is that it must be able to handle large currents and at the same time also high signal voltages at its terminals.

TDD Transmit Isolation Mode

Figure 5:
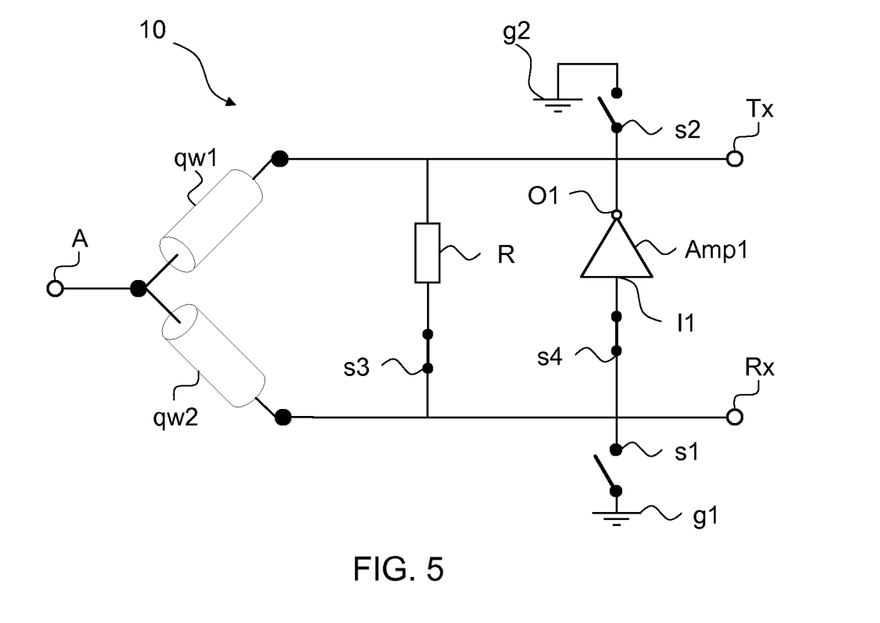
Figure 6:
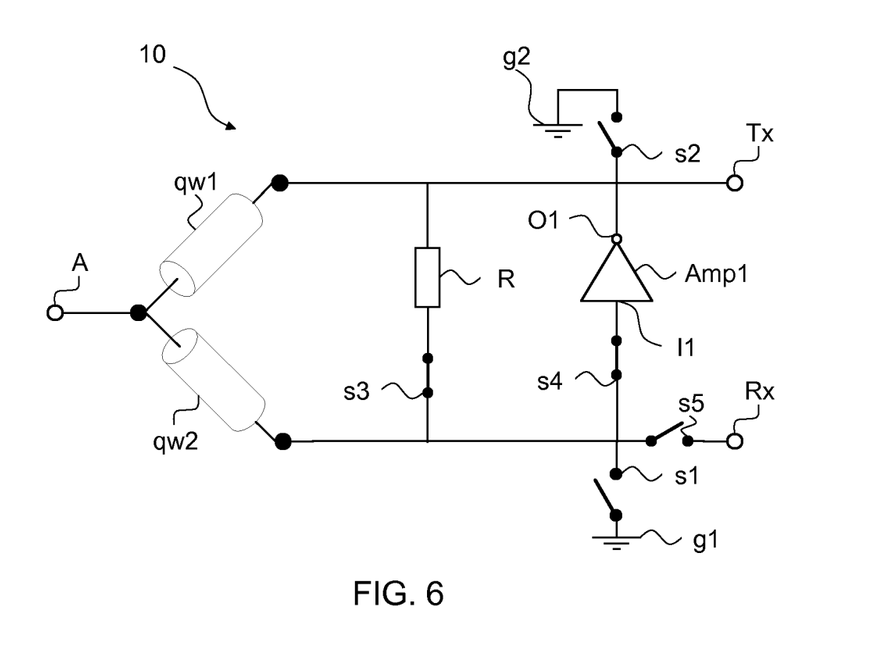

Aspects of antenna connection circuits reconfigurable for TDD transmit isolation mode are now described in relation to FIGS. 5-6.

According to aspects, the first ground switch s1 is open, the second ground switch s2 is open, the resistor switch s3 is closed, and the inverting amplifier switch s4 is closed in the second communication mode.

In FIG. 5 the circuit is reconfigured for transmit isolation mode. The receiver may be switched out of the circuit to prevent its input resistance from loading the circuit. According to one aspect the receiver port Rx is connected to a Low-Noise Amplifier, LNA. The receiver may then be switched out by turning of the LNA.

Alternatively or additionally, the antenna connection circuit further comprises an open receiver port switch s5 coupled in series to the receiver port Rx, as shown in FIG. 6. Hence, the receiver may be switched off by using a series switch. The voltages and currents at the receiver input port are small, so using a series switch here is less of a concern.

In the embodiments of FIGS. 5 and 6 the inverting amplifier Amp1 is used to make the transfer between transmitter and antenna non-reciprocal. The resistor is again part of the circuit, providing isolation between the transmitter and what used to be the receive port, as described in relation to FIG. 2. Hence, there will then be no input signal of the inverting amplifier due to the transmit signal. The only signal reaching the inverting amplifier is the one received by the antenna. However, this signal is cancelled before it reaches the transmitter port. This is explained by looking at a node between the first quarter-wave transmission line qw1 and the transmitter port. In this node one signal (received by the antenna) arrives which has passed through the first quarter-wave transmission line qw1, which introduces a 90 degrees phase shift. This signal is cancelled by the signal (received by the antenna) which has passed through the second quarter-wave transmission qw2 and the inverting amplifier Amp1, and thereby has a 90 degrees plus 180 degrees phase shift. In other words, in isolation mode the additional amplifier only needs to process signals coming from the antenna, since its input is isolated from the power amplifier output signal.

Since the only signal reaching the inverting amplifier is the one received by the antenna the current requirements and power consumption of the inverting amplifier is reduced. The presence of the resistor, however, provides a 3 dB loss penalty for the transmitter to antenna transfer.

Hence, reverse isolation is achieved between the antenna and the transmitter which prevents coupling between different transmitters.

FDD Mode and Full Duplex Mode

As previously described, the proposed solutions relate to an antenna connection circuit that easily can be reconfigured in order to support different communication modes depending on circumstances.

The antenna connection circuits described in relation to FIGS. 3-6 may also be reconfigured to support FDD transmission/reception and Full Duplex modes. Hence, according to aspects, the first ground switch s1 is open, the second ground switch s2 is open, the resistor switch s3 is closed, and the inverting amplifier switch s4 is open. The functionality and the advantages of the configured circuit are the same as those described in relation to FIG. 2.

An advantage with this circuitry is that, in full duplex mode the use of transformers is avoided, and the additional losses to the 3 dB inherent in electrical balance isolators can then be reduced.

Hence, it is provided a flexible, low-complex antenna connection circuit which easily can be reconfigured to support several communication modes. When operating in TDD reception mode the configuration as shown in FIG. 3 may be used, and when operating in TDD transmission mode the configuration as shown in FIG. 4 may be used. However, if there are requirements for antenna to transmitter isolation then the configuration shown in FIG. 5 or 6 may be used during transmission, and the configuration as in FIG. 3 while receiving. If full duplex or close duplex distance FDD operation is required the configuration where the first ground switch s1 is open, the second ground switch s2 is open, the resistor switch s3 is closed, and the inverting amplifier switch s4 is open, is to be used.

Figure 7:
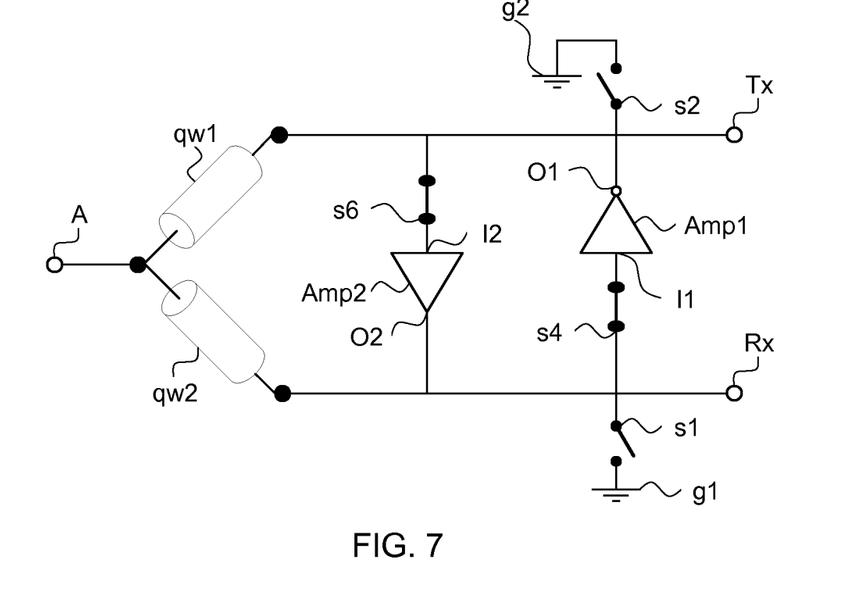

A further alternative is a circuit where the resistor R is replaced by a non-inverting amplifier Amp2, such that the amplifiers are configured to implement a so called Gyrator. FIG. 7 illustrates an antenna connection circuit according to such aspects of the disclosed subject matter. Present is an antenna connection circuit 10 for a communication device 1 wherein the antenna connection circuit 10 is configurable for communication modes, comprising at least a first, a second, a third and a fourth communication mode.

According to some aspects, the first communication mode is Time Domain Duplex, TDD, reception. According to further aspects, the second communication mode is Time Domain Duplex, TDD, transmission. According to further aspects, the third communication mode is Frequency Domain Duplex, FDD, reception and the fourth communication mode is Frequency Domain Duplex, FDD, transmission. According to further aspects, a communication mode is a Full Duplex transmission/reception mode.

The antenna connection circuit 10 comprises an antenna port A, a transmitter port Tx, and a receiver port Rx. It further comprises a first quarter-wave transformer qw1, a second quarter-wave transformer qw2, a first ground switch s1, a second ground switch s2, an inverting amplifier switch s4, and a non-inverting amplifier switch s6.

The antenna connection circuit 10 further comprises an inverting amplifier Amp1 comprising an input port I1 and an output port O1 and a non-inverting amplifier Amp2 comprising an input port I2 and an output port O2. The non-inverting amplifier does not introduce a phase shift. According to aspects, the non-inverting amplifier is a non-inverting transconductance amplifier.

The antenna connection circuit 10 further comprises a first ground connection g1, and a second ground.

As shown in FIG. 7, the first quarter-wave transformer qw1 is coupled between the antenna port A and the transmitter port Tx. The second quarter-wave transformer qw2 is coupled between the antenna port A and the receiver port Rx. The first ground switch s1 is coupled between the receiver port Rx and the first ground connection g1. The second ground switch s2 is coupled between the transmitter port Tx and the second ground connection g2. Furthermore, the inverting amplifier switch s4 is coupled between the receiver port Rx and the input port I1 of the inverting amplifier Amp1 and the output port O1 of the inverting amplifier Amp1 is coupled to the transmitter port Tx. The non-inverting amplifier switch s6 is coupled between the transmitter port Tx and the input port I2 of the non-inverting amplifier Amp2 and the output port O2 of the non-inverting amplifier Amp2 is coupled to the receiver port Rx. In other words, the serial connection of the inverting amplifier switch s4 and the inverting amplifier Amp1 and the serial connection of the non-inverting amplifier Amp2 and the non-inverting amplifier switch s6 are in parallel. Furthermore, when the inverting amplifier switch s4 and the non-inverting amplifier switch s6 are closed, the parallel connection of the inverting amplifier Amp1 and the non-inverting amplifier constitutes a gyrator.

According to aspects, the receiver port Rx is coupled to the input port I1 of the inverting amplifier Amp1 and the inverting amplifier switch s4 is coupled between output port O1 of the inverting amplifier Amp1 and the transmitter port Tx.

According to aspects, the inverting amplifier switch s4 is integrated in the inverting amplifier Amp1.

According to aspects, the non-inverting amplifier switch s6 is coupled between the receiver port Rx and the output port O2 of the non-inverting amplifier Amp2 and the input port I1 of the non-inverting amplifier Amp2 is coupled to the transmitter port Tx.

According to aspects, the non-inverting amplifier switch s6 is integrated in the non-inverting amplifier Amp2.

The same exemplifications and further elaborations are to be applied as well as the same advantages and benefits are to be obtained as for the corresponding devices and features of the previously described examples, respectively.

By using this solution the antenna interface can be reconfigured for different modes of operation. It can handle full duplex, frequency duplex (FDD), time division duplex (TDD), as well as transmission with isolation. All this can be achieved with simple circuitry featuring transmission lines, a resistor, amplifiers, and switches for reconfiguration.

FDD Mode and Full Duplex Mode

Aspects of antenna connection circuits reconfigurable for FDD mode and Full Duplex mode are now described in relation to FIG. 7.

According to aspects, the first ground switch s1 is open, the second ground switch s2 is open, the inverting amplifier switch s4 is closed, and the non-inverting amplifier switch s6 is closed in the third communication mode or the fourth communication mode. In other words, a gyrator configuration is present.

One benefit of introducing the gyrator (the parallel connection of the amplifiers Amp1 and Amp2) is that ideally there is no insertion loss from transmitter to antenna or from antenna to receiver.

A further advantage is that there is reverse isolation between the ports. This is due to the fact that: in reception mode, the part of the received signal that has passed through the first quarter-wave transmission line qw1 (a phase shift of 90 degrees is introduced) is cancelled by the part of the received signal that has passed through the second quarter-wave transmission line qw2 (+90 degrees) and the inverting amplifier Amp1 (+180 degrees). Further, the part of the received signal that has passed through the first quarter-wave transmission line qw1 (+90 degrees) and the non-inverting amplifier (+0 degrees) is added to the part of the received signal that has passed through the second quarter-wave transmission line qw2 (+90 degrees). In transmit mode: the part of the transmitted signal that has passed through first quarter-wave transmission line qw1 (+90 degrees) and the second quarter-wave transmission line qw2 (+90 degrees) is cancelled by the part of the transmitted signal that has passed through the non-inverting amplifier (+0 degrees).

An advantage with this circuitry is that, in full duplex mode the use of transformers is avoided, and the additional losses to the 3 dB inherent in electrical balance isolators can then be reduced.

A further advantage of using a gyrator is that the only inherent loss is the one from the transmission lines.

TDD Mode

Figure 8:
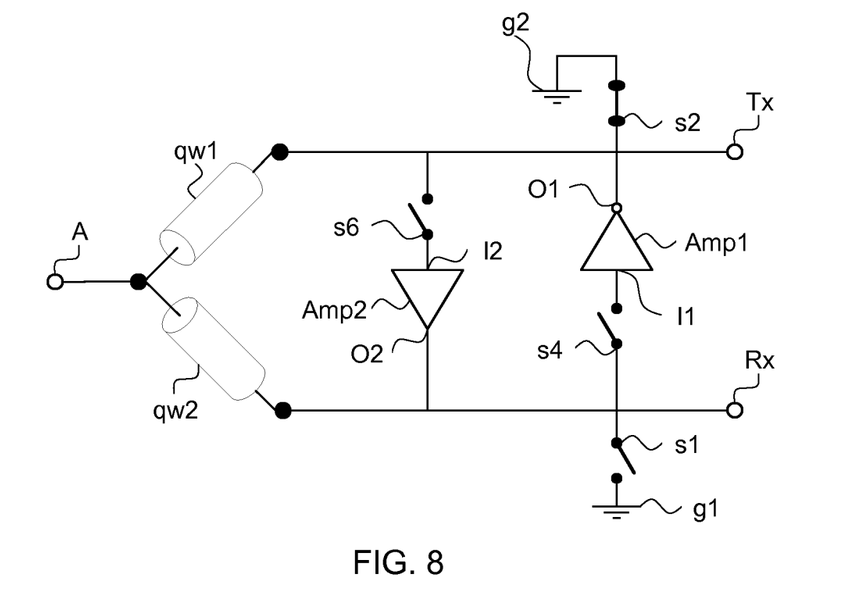
Figure 9:
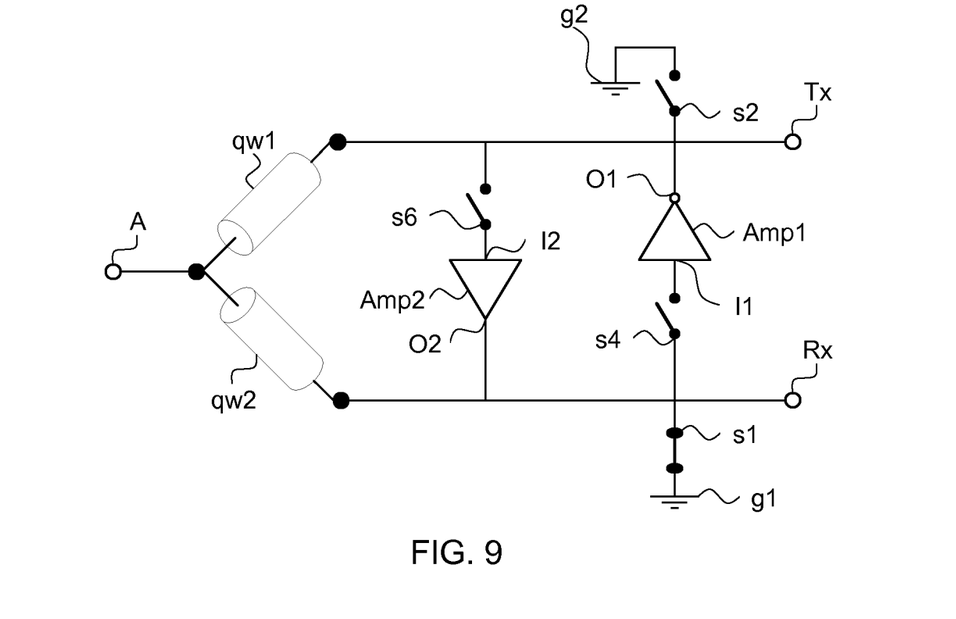

Aspects of antenna connection circuits reconfigurable for TDD mode are now described in relation to FIGS. 8-9.

According to aspects, the first ground switch s1 is open, the second ground switch s2 is closed, the inverting amplifier switch s4 is open, and the non-inverting amplifier switch s6 is open in the first communication mode, as shown in FIG. 8. According to aspects this circuit is configured for TDD reception operation.

According to further aspects, the first ground switch s1 is closed, the second ground switch s2 is open, the inverting amplifier switch s4 is open, and the non-inverting amplifier switch s6 is open in the second communication mode, as shown in FIG. 9. According to aspects this circuit is configured for TDD transmit operation.

The operational mode as described in relation to FIG. 8 corresponds to the operational mode as described in relation to FIG. 3. Further, the operational mode as described in relation to FIG. 9 corresponds to the operational mode as described in relation to FIG. 4.

A further alternative is a circuit where both a resistor R and a non-inverting amplifier Amp2 is present in addition to the inverting amplifier Amp1. Aspects of such antenna connection circuits are now described with reference to FIGS. 10-11.

Figure 10:
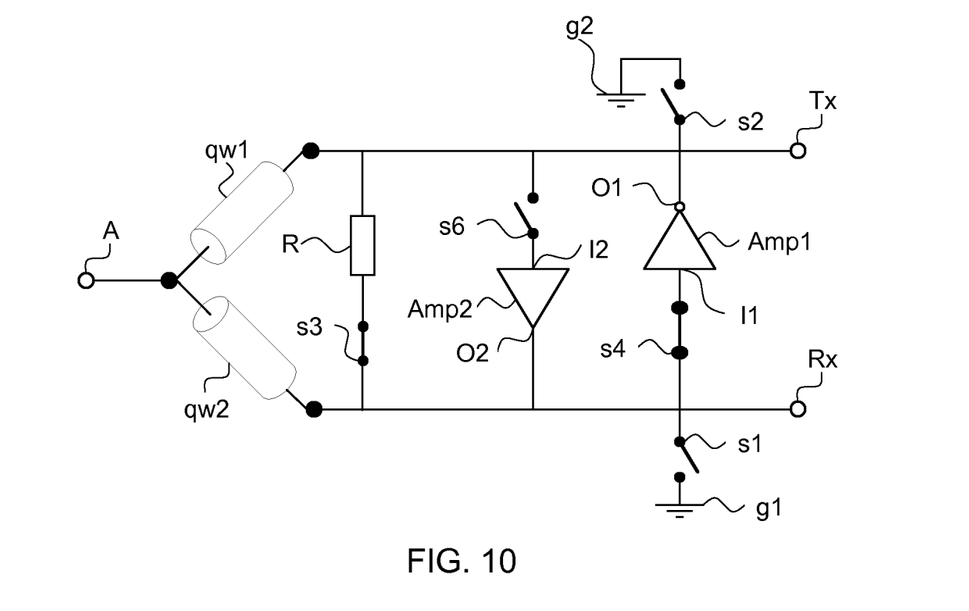

FIG. 10 illustrates an antenna connection circuit 10 further comprising a resistor R and a resistor switch s3, wherein the resistor R and the resistor switch s3 are coupled in series between the receiver port Rx and the transmitter port Tx. According to aspects, the resistor R is coupled in series between the receiver port Rx and the resistor switch s3. According to alternative aspects, the resistor switch s3 is coupled in series between the receiver port Rx and the resistor R.

In other words, a serial connection of the inverting amplifier switch s4 and the inverting amplifier Amp1 and a serial connection of the non-inverting amplifier Amp2 and the non-inverting amplifier switch s6 and a serial connection of the resistor R and the resistor switch s3 are in parallel.

A person skilled in the art knows how to dimension the impedances and transconductances of the provided electronic components in order to obtain circuits enabling different communication modes. Some examples of impedance and transconductance values are given below. These should be seen as non-limiting examples.

According to aspects, an antenna connection circuit 10 is present wherein an impedance of the antenna port A is essentially equal to a system impedance. According to aspects the system impedance is the input impedance of the transmission circuitry system and/or the input impedance of the receiving circuitry system and/or the input impedance of the antenna circuitry system. According to aspects, the system impedance is between 5 and 500 Ohm or between 25 and 100 Ohm or essentially equal to 50 Ohm.

The term "essentially" should throughout the text be interpreted as meaning both "exactly the same" and "close to but not exactly the same", since in reality it may be difficult to achieve exactly the same value. It also means that the value is within a reasonable tolerance level known within the technical field.

According to aspects "essentially" may be interpreted as:
$0.9 \leq$ (the impedance of the antenna port/the system impedance) $\leq 1.1$; or
$0.95 \leq$ (the impedance of the antenna port/the system impedance) $\leq 1.05$; or
$0.99 \leq$ (the impedance of the antenna port/the system impedance) $\leq 1.01$.

Where "/" is used herein it is to be understood as "divided by", "$\leq$" is to be understood as "less than or equal to", and "sqrt" is to be understood as the "square root".

Furthermore, an impedance of the transmitter port Tx, an impedance of the receiver port Rx, an impedance of the resistor R, an impedance of the first quarter-wave transformer qw1, and an impedance of the second quarter-wave transformer qw2 are proportional to the system impedance.

According to aspects the impedances of the transmitter port, the receiver port and/or the resistor are between 0.5*the system impedance and 2.5*the system impedance, or essentially equal to the system impedance, or essentially equal to 2*the system impedance.

According to aspects "essentially" may be interpreted as:
$0.9 \leq$ (the impedance of the transmitter port/the system impedance) $\leq 1.1$; or
$0.95 \leq$ (the impedance of the transmitter port/the system impedance) $\leq 1.05$; or
$0.99 \leq$ (the impedance of the transmitter port/the system impedance) $\leq 1.01$
where "transmitter port" may be replaced by "receiver port" or "resistor.

According to further aspects "essentially" may be interpreted as:
$0.9 \leq$ (the impedance of the transmitter port/2/the system impedance) $\leq 1.1$; or
$0.95 \leq$ (the impedance of the transmitter port/2/the system impedance) $\leq 1.05$; or
$0.99 \leq$ (the impedance of the transmitter port/2/the system impedance) $\leq 1.01$
where "transmitter port" may be replaced by "receiver port" or "resistor.

According to aspects the impedances of the first quarter-wave transformer and/or the second quarter-wave transformer are between 0.7*the system impedance and 1.5*the system impedance, or essentially equal to sqrt(2)*the system impedance, or essentially equal to the system impedance.

According to further aspects "essentially" may be interpreted as:
$0.9 \leq$ (the impedance of the first quarter-wave transformer/sqrt(2)/the system impedance) $\leq 1.1$; or
$0.95 \leq$ (the impedance of the first quarter-wave transformer/sqrt(2)/the system impedance) $\leq 1.05$; or
$0.99 \leq$ (the impedance of the first quarter-wave transformer/sqrt(2)/the system impedance) $\leq 1.01$
where "the first quarter-wave transformer" may be replaced by "the second quarter wave transformer".

According to further aspects "essentially" may be interpreted as:
$0.9 \leq$ (the impedance of the first quarter-wave transformer/the system impedance) $\leq 1.1$; or
$0.95 \leq$ (the impedance of the first quarter-wave transformer/the system impedance) $\leq 1.05$; or
$0.99 \leq$ (the impedance of the first quarter-wave transformer/the system impedance) $\leq 1.01$
where "the first quarter-wave transformer" may be replaced by "the second quarter wave transformer".

Moreover, a transconductance of the inverting amplifier Amp1 and a transconductance of the non-inverting amplifier Amp2 are proportional to the inverse of the system impedance.

According to aspects, the transconductance of the inverting amplifier Amp1 and/or the transconductance of the non-inverting amplifier Amp2 are between 0.25*the inverse of the system impedance and 1.5*the inverse of the system impedance, or essentially equal to 0.5*the inverse of the system impedance, or essentially equal to the inverse of the system impedance.

According to aspects "essentially" may be interpreted as:
0.9<=the transconductance of the inverting amplifier*2*the system impedance <=1.1; or
0.95<=(the transconductance of the inverting amplifier*2*the system impedance)<=1.05; or
0.99<=(the transconductance of the inverting amplifier*2*the system impedance)<=1.01
where "the transconductance of the inverting amplifier" may be replaced by "the transconductance of the non-inverting amplifier".

According to aspects "essentially" may be interpreted as:
0.9<=the transconductance of the inverting amplifier*the system impedance <=1.1; or
0.95<=(the transconductance of the inverting amplifier*the system impedance)<=1.05; or
0.99<=(the transconductance of the inverting amplifier*the system impedance)<=1.01
where "the transconductance of the inverting amplifier" may be replaced by "the transconductance of the non-inverting amplifier".

FDD Mode and Full Duplex Mode

According to further aspects the resistor switch s3 is open.

Figure 11:
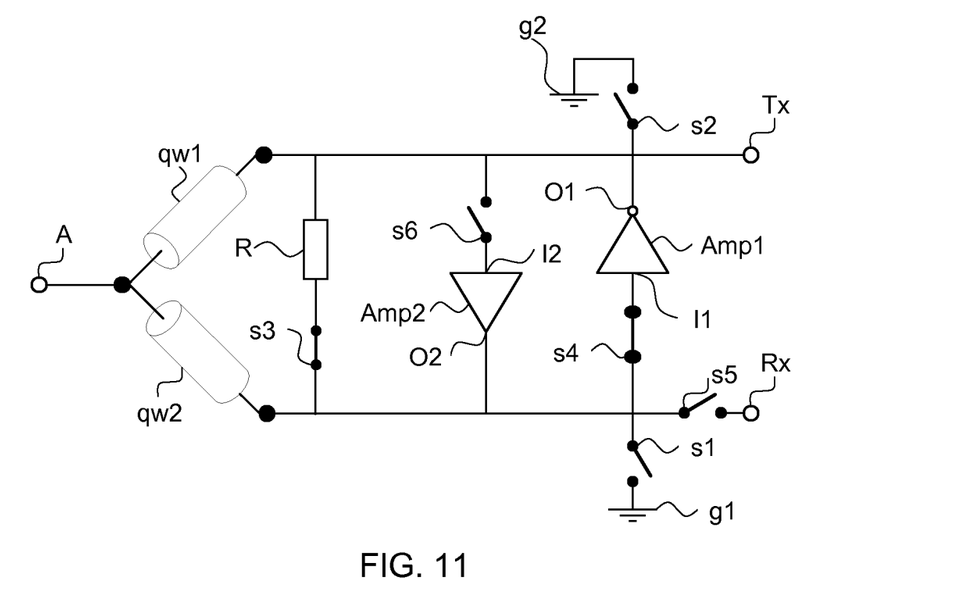

According to aspects, the antenna connection circuits described in relation to FIGS. 10-11 may be reconfigured to support FDD transmission/reception and Full Duplex modes by operating the first ground switch s1, the second ground switch s2, the inverting amplifier switch s4 and the non-inverting amplifier switch as described in relation to FIG. 7.

The antenna connection circuits described in relation to FIGS. 10-11 may also be reconfigured to support FDD transmission/reception and Full Duplex modes in an alternative manner. Hence, according to aspects, the first ground switch s1 is open, the second ground switch s2 is open, the resistor switch s3 is closed, the non-inverting amplifier switch s6 is open and the inverting amplifier switch s4 is open. The operational mode corresponds to the operational mode as described in relation to FIG. 2.

TDD Mode

According to further aspects the resistor switch s3 is open.

According to aspects, the antenna connection circuits described in relation to FIGS. 10-11 maybe reconfigured to support TDD reception by operating the first ground switch s1, the second ground switch s2, the inverting amplifier switch s4 and the non-inverting amplifier switch as described in relation to FIG. 8.

According to aspects, the antenna connection circuits described in relation to FIGS. 10-11 may be reconfigured to support TDD transmission by operating the first ground switch s1, the second ground switch s2, the inverting amplifier switch s4 and the non-inverting amplifier switch as described in relation to FIG. 9.

TDD Transmit Isolation Mode

Aspects of antenna connection circuits reconfigurable for TDD transmit isolation mode are now described in relation to FIGS. 10-11.

According to aspects, the first ground switch s1 is open, the second ground switch s2 is open, the resistor switch s3 is closed, the inverting amplifier switch s4 is closed, and the non-inverting amplifier switch s6 is open in the second communication mode.

In FIG. 5 the circuit is reconfigured for transmit isolation mode. The receiver is switched out of the circuit to prevent its input resistance from loading the circuit. According to one aspect the receiver port Rx is connected to a Low-Noise Amplifier, LNA. The receiver may then be switched out by turning off the LNA.

Alternatively or additionally, the antenna connection circuit 10 further comprises an open receiver port switch s5 coupled in series to the receiver port Rx, as shown in FIG. 11.

Hence, the receiver may be switched off by using a series switch. The voltages and currents at the receiver input port are small, so using a series switch here is less of a concern.

The operational mode as described in relation FIG. 10 corresponds to the operational mode as described in relation to FIG. 5. Further, the operational mode as described in relation to FIG. 11 corresponds to the operational mode as described in relation to FIG. 6.

It is provided a reconfigurable antenna connection circuit, which supports TDD transmission/reception mode, TDD transmitter isolation mode, FDD transmission/reception mode and full duplex transmission/reception mode. Hence, the solution is very flexible.

Moreover, losses are reduced compared to alternative solutions.

According to aspects, the solutions do not require bulky components. Hence, the antenna connecting circuit can be small.

According to further aspects, the required components are small and/or cheap components.

The disclosed subject matter further relates to a communication device 1, figuratively illustrated in FIG. 1. The communication device 1 comprises an antenna connection circuit 10. All aspects, examples and advantages discussed in relation to the antenna connection circuit apply accordingly to the communication device 1.

A communication device may be any device known to a person skilled in the art suitable for the purpose. That is, any communication device utilizing communication modes as described herein.

Hence, according to aspects, the communication device is configurable for at least one of Frequency Division Duplex, FDD, signalling, Time Division Duplex, TDD, signalling, and Full Duplex signalling.

According to further aspects, the communication device 1 further comprises transmission circuitry 5 coupled to the transmitter port Tx and receiving circuitry 4 coupled to the receiver port Rx.

According to further aspects, the communication device 1 further comprises antenna circuitry 3 coupled to the antenna port A.

Transmission circuitry, receiving circuitry and antenna circuitry has previously been described in relation to FIG. 3.

According to further aspects the communication device is one of: a wireless communication device, WCD or a network node.

Within the context of this disclosure, the terms "network node" or "wireless device" encompass any device which is able to communicate wirelessly with another device, as well as, optionally, with an access node of a wireless network, by transmitting and/or receiving wireless signals. Thus, the term "wireless communication device" encompasses, but is not limited to: a user equipment, e.g. an LTE UE, a mobile terminal, a stationary or mobile wireless device for machine-to-machine communication, a Machine Type Communication, MTC, device, a Machine Device, MD, an integrated or embedded wireless card, an externally plugged in wireless card, a dongle etc. Further, the term "network node" encompasses, but is not limited to: eNodeB, eNB, macro/micro/ pico base station, home eNodeB, relay, discovery signal device, access node/point, or repeater.

The proposed solutions is herein described and exemplified with specific electronic components. However, other electronic components or devices known to any skilled in the art and suitable for the purpose may be utilized.

When a reference is given to the description of a specific Figure the exemplifications, elaborations and advantages given in relation to that Figure may be applicable to the embodiments where the reference is given.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

The invention claimed is:

1. An antenna connection circuit for a communication device, wherein the antenna connection circuit is configurable for communication modes, the communication modes including at least a first communication mode and a second communication mode, the antenna connection circuit comprising:
an antenna port; a transmitter port; a receiver port;
a first quarter-wave transformer; a second quarter-wave transformer;
a first ground switch; a second ground switch; a resistor switch; an inverting amplifier switch;
a resistor;
an inverting amplifier comprising an input port and an output port;
a first ground connection; a second ground connection;
wherein the first quarter-wave transformer is coupled between the antenna port and the transmitter port;
wherein the second quarter-wave transformer is coupled between the antenna port and the receiver port;
wherein the first ground switch is coupled between the receiver port and the first ground connection;
wherein the second ground switch is coupled between the transmitter port and the second ground connection;
wherein the resistor and the resistor switch are coupled in series between the receiver port and the transmitter port;
wherein the inverting amplifier switch is coupled between the receiver port and the input port of the inverting amplifier; and
wherein the output port of the inverting amplifier is coupled to the transmitter port.

2. The antenna connection circuit of claim 1, wherein, in the first communication mode: the first ground switch is open; the second ground switch is closed; the resistor switch is open; and the inverting amplifier switch is open.

3. The antenna connection circuit of claim 1, wherein, in the second communication mode:
the first ground switch is closed;
the second ground switch is open;
the resistor switch is open; and
the inverting amplifier switch is open.

4. The antenna connection circuit of claim 1, wherein, in the second communication mode:
the first ground switch is open;
the second ground switch is open;
the resistor switch is closed; and
the inverting amplifier switch is closed.

5. The antenna connection circuit of claim 4, further comprising a receiver port switch coupled in series to the receiver port; wherein the receiver port switch is open in the second communication mode.

6. The antenna connection circuit of claim 1, wherein:
the first communication mode is for Time Domain Duplex (TDD) reception; and
the second communication mode is for Time Domain Duplex (TDD) transmission.

7. The antenna connection circuit of claim 1, wherein the receiver port is connected to a Low-Noise Amplifier.

8. An antenna connection circuit for a communication device, wherein the antenna connection circuit is configurable for communication modes; the communication nodes comprising at least a first, a second, a third, and a fourth communication mode; the antenna connection circuit comprising:
an antenna port; a transmitter port; a receiver port;
a first quarter-wave transformer; a second quarter-wave transformer;
a first ground switch; a second ground switch; an inverting amplifier switch; a non-inverting amplifier switch;
an inverting amplifier comprising an input port and an output port;
a non-inverting amplifier comprising an input port and an output port;
a first ground connection; a second ground connection;
wherein the first quarter-wave transformer is coupled between the antenna port and the transmitter port;
wherein the second quarter-wave transformer is coupled between the antenna port and the receiver port;
wherein the first ground switch is coupled between the receiver port and the first ground connection;
wherein the second ground switch is coupled between the transmitter port and the second ground connection;

wherein the inverting amplifier switch is coupled between the receiver port and the input port of the inverting amplifier;

wherein the output port of the inverting amplifier is coupled to the transmitter port;

wherein the non-inverting amplifier switch is coupled between the transmitter port and the input port of the non-inverting amplifier; and the output port of the non-inverting amplifier is coupled to the receiver port.

9. The antenna connection circuit of claim 8, wherein, in the third communication mode or the fourth communication mode:

the first ground switch is open;
the second ground switch is open;
the inverting amplifier switch is closed; and
the non-inverting amplifier switch is closed.

10. The antenna connection circuit of claim 8, wherein, in the first communication mode:

the first ground switch is open;
the second ground switch is closed;
the inverting amplifier switch is open; and
the non-inverting amplifier switch is open.

11. The antenna connection circuit of claim 8, wherein, in the second communication mode:

the first ground switch is closed;
the second ground switch is open;
the inverting amplifier switch is open; and
the non-inverting amplifier switch is open.

12. The antenna connection circuit of claim 8, further comprising a resistor and a resistor switch; wherein the resistor and the resistor switch are coupled in series between the receiver port and the transmitter port.

13. The antenna connection circuit of claim 12:

wherein an impedance of the antenna port is essentially equal to a system impedance;

wherein an impedance of the transmitter port, an impedance of the receiver port, an impedance of the resistor, an impedance of the first quarter-wave transformer, and an impedance of the second quarter-wave transformer are proportional to the system impedance; and wherein a transconductance of the inverting amplifier and a transconductance of the non-inverting amplifier are proportional to the inverse of the system impedance.

14. The antenna connection circuit of claim 12, wherein, in the second communication mode:

the first ground switch is open;
the second ground switch is open;
the resistor switch is closed;
the inverting amplifier switch is closed; and
the non-inverting amplifier switch is open.

15. The antenna connection circuit of claim 14, further comprising a receiver port switch coupled in series to the receiver port; wherein the receiver port switch is open in the second communication mode.

16. The antenna connection circuit of claim 8, wherein the receiver port is connected to a Low-Noise Amplifier.

17. The antenna connection circuit of claim 8, wherein:

the first communication mode is for Time Domain Duplex (TDD) reception; and the second communication mode is for TDD transmission.

18. The antenna connection circuit of claim 8, wherein:

the third communication mode is for Frequency Domain Duplex (FDD) reception; and the fourth communication mode is for FDD transmission.

19. A communication device, comprising:

an antenna connection circuit configurable for communication modes, the communication modes including at least a first communication mode and a second communication mode; the antenna connection circuit comprising:

an antenna port; a transmitter port; a receiver port;
a first quarter-wave transformer; a second quarter-wave transformer;
a first ground switch; a second ground switch; a resistor switch; an inverting amplifier switch;
a resistor;
an inverting amplifier comprising an input port and an output port;
a first ground connection; a second ground connection;

wherein the first quarter-wave transformer is coupled between the antenna port and the transmitter port;

wherein the second quarter-wave transformer is coupled between the antenna port and the receiver port;

wherein the first ground switch is coupled between the receiver port and the first ground connection;

wherein the second ground switch is coupled between the transmitter port and the second ground connection;

wherein the resistor and the resistor switch are coupled in series between the receiver port and the transmitter port;

wherein the inverting amplifier switch is coupled between the receiver port and the input port of the inverting amplifier; and wherein the output port of the inverting amplifier is coupled to the transmitter port.

20. The communication device of claim 19, further comprising:

transmission circuitry coupled to the transmitter port; and
receiving circuitry coupled to the receiver port.

* * * * *